US010331590B2

(12) United States Patent
MacNamara et al.

(10) Patent No.: US 10,331,590 B2
(45) Date of Patent: Jun. 25, 2019

(54) GRAPHICS PROCESSING UNIT (GPU) AS A PROGRAMMABLE PACKET TRANSFER MECHANISM

(71) Applicant: Intel Corporation, Santa Clara, CA (US)

(72) Inventors: Chris MacNamara, Ballyclough (IE); Tomasz Kantecki, Ennis (IE); John J. Browne, Limerick (IE)

(73) Assignee: Intel Corporation, Santa Clara, CA (US)

( * ) Notice: Subject to any disclaimer, the term of this patent is extended or adjusted under 35 U.S.C. 154(b) by 281 days.

(21) Appl. No.: 15/198,714

(22) Filed: Jun. 30, 2016

(65) Prior Publication Data
US 2018/0004693 A1    Jan. 4, 2018

(51) Int. Cl.
*G06F 13/10*    (2006.01)
*G06F 13/28*    (2006.01)
*G06T 1/20*    (2006.01)

(52) U.S. Cl.
CPC ............... *G06F 13/28* (2013.01); *G06T 1/20* (2013.01); *G06T 2200/28* (2013.01)

(58) Field of Classification Search
None
See application file for complete search history.

(56) References Cited

U.S. PATENT DOCUMENTS

| 8,996,644 B2* | 3/2015 | Pope ............... G06F 13/102 370/419 |
| 9,658,981 B2* | 5/2017 | Rossetti ............... H04L 49/90 |
| 2009/0089351 A1 | 4/2009 | Belgaied et al. |
| 2015/0052325 A1 | 2/2015 | Persson et al. |
| 2015/0237058 A1 | 8/2015 | Chritz et al. |
| 2016/0164807 A1 | 6/2016 | Engel et al. |
| 2016/0173104 A1 | 6/2016 | Vassiliev |

FOREIGN PATENT DOCUMENTS

WO    WO-2018004896 A1    1/2018

OTHER PUBLICATIONS

"International Application Serial No. PCT/US2017/034429, International Search Report dated Aug. 30, 2017", 3 pgs.
"International Application Serial No. PCT/US2017/034429, Written Opinion dated Aug. 30, 2017", 11 pgs.
Han, Sangjin, et al., "PacketShader: a GPU-Accelerated Software Router", SIGCOMM'10, (2010), 12 pgs.

(Continued)

*Primary Examiner* — Cheng Yuan Tseng
(74) *Attorney, Agent, or Firm* — Schwegman Lundberg & Woessner, P.A.

(57) ABSTRACT

Discloses is an apparatus including a network interface controller (NIC), memory, and an accelerator. The accelerator can include a direct memory access (DMA) controller configured to receive data packets from the NIC and to provide the data packets to the memory. The accelerator can also include processing circuitry to generate processed data packets by implementing packet processing functions on the data packets received from the NIC, and to provide the processed data packets to at least one processing core. Other methods, apparatuses, articles and systems are also described.

24 Claims, 6 Drawing Sheets

(56) References Cited

OTHER PUBLICATIONS

Lee, Youngjun, et al., "Fast Forwarding Table Lookup Exploiting GPU Memory Architecture", ICTC 978-1-422-9807-9 IEEE, (2010), 341-345.
Mu, Shuai, et al., "IP Routing Processing with Graphic Processors", 978-3-9810801-6-2/DATE10 EDAA, (2010), 6 pgs.
Vasiliadis, Giorgos, et al., "Gnort: High Performance Network Intrusion Detection Using Graphics Processors", Institute of Computer Science, Foundation for Research and Technology, (2008), 19 pgs.
Zhao, Jin, et al., "Achieving O(1) IP Lookup on GPU-based Software Routers", SIGCOMM'10, (2010), 2 pgs.
Zhu, Yuhao, et al., "Hermes: An Integrated CPU/GPU Microarchitecture for IP Routing", DAC'11 ACM 978-1-4503-0636-2/11/06, (Jun. 2011), 1044-1049.

\* cited by examiner

GRAPHICS PROCESSING UNIT (GPU) AS A PROGRAMMABLE PACKET TRANSFER MECHANISM

TECHNICAL FIELD

Embodiments relate generally to information processing and communications and, more particularly, to circuits that communicate data from a host computer system over a computer network.

BACKGROUND

Currently, network cards receive data packets and pass them on to a computing device for processing. As the need for speed in processing network data increases, efforts have been generally directed to improving packet processing speed.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
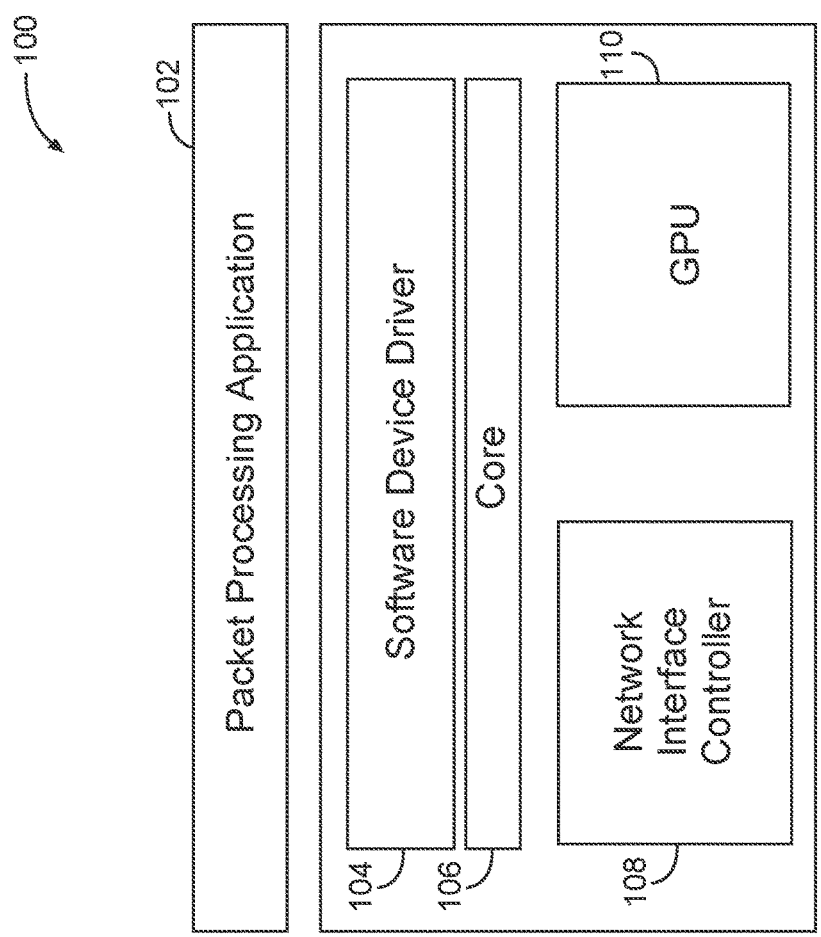
FIG. 1 illustrates a schematic of an architecture in accordance with some embodiments.

Network interface performance has been increasing in recent years. However, packet processing has not kept pace with network interface performance gains.

Various parameters and conditions can affect the performance of packet processing. For example, central processing unit (CPU) speed and utilization, interrupt overhead, bus bandwidth, memory latency, and I/O latency can affect the performance of packet processing applications. Some examples of CPU overhead that affects packet processing can include overhead involved with memory allocation and deallocation for each packet, copying data between kernel and user-space, expensive cache misses, per-packet system calls, and the transformation of the parallelized processing of packets by the queues of multi-queue network interface controllers (NICs) to a serialized one. The latter condition can occur when all packets converge to one single point, thus creating a bottleneck.

The architecture of Graphical Processing Units (GPU) can enable highly parallel processing in GPUs, and this capability can be used to improve packet processing performance to address the above concerns, as well as other concerns. Programmable GPUs can act as co-processors by receiving code, data, and commands from the host CPU. Recent efforts in GPU development have been directed to increasing parallelism. As such, GPUs today can have hundreds or thousands cores. Together, the thousands of cores in a GPU can provide greater throughput than the single CPU core for many types of highly parallel tasks. GPU usefulness can be enhanced by launching multiple threads per GPU core to provide high thread-level parallelism. By using high thread-level parallelism, a GPU can reduce memory access latency by executing a considerable number of threads. Similarly, the processing power of the GPU can be used for computing-intensive operations that run on software routers and thus overcome the bottleneck posed by the CPU. Accordingly, embodiments described herein take advantage of the high thread-level parallelism capability of GPUs to perform packet processing functions to reduce or eliminate at least one source of system bottleneck and slowdown.

Embodiments that can use a GPU in combination with a NIC to perform packet processing are described herein. The NIC can also be referred to as a host-fabric interface (HFI). Using the GPU and NIC in combination can make it appear to a host that a single integrated Ethernet device can provide various kinds of programmable offloads and network virtualization. As disclosed herein, this unique combination of components and techniques combines the GPU and CPU operation to result in improved performance for data center operators and other networking customers. In addition, embodiments can allow for more flexible and programmable packet processing functions.

In some prior systems, data packets enter a CPU directly from the NIC. In contrast, in embodiments disclosed herein, the data packets can be processed prior to entering the CPU by combining the NIC and GPU as one unit. Thus, the data packets can be pre-processed on the GPU after NIC processing, before entering the CPU, and vice versa when packets are transmitted. Stated another way, the CPU and the NIC can be daisy-chained so as to appear transparently to the system software as a single complex device. The MC can transfer (e.g. via a direct memory access (DMA) controller) data packets directly to and from the GPU and the GPU can apply additional packet processing functions before making the final transfer to and from the CPU.

An embodiment of the combined NIC and GPU can be represented via a newly defined virtual I/O model that combines both hardware functions of the NIC and the GPU. The combined GPU and NIC functions as a single software layer can be viewed as a "virtual NIC." The meta-data presented by the virtual NIC may represent parameters such as the combined offload capability of the GPU and NIC, and the offloads performed or to be performed on a packet by the GPU and NIC, as well as other parameters. This allows software applications using the combined GPU/NIC to view and/or control the offloads performed.

Using GPUs for packet processing can provide improved performance for specific offloads. For example, using GPUs for packet processing can show increased offload performance for stateless packet processing. As disclosed herein, computational time for some algorithms can be improved when various data packets are processed on a GPU. The increase in speed can be limited by factors such as, but not limited to, the bandwidth between a CPU and the GPU, and availability of computation resources.

The bandwidth issues can be addressed using a hardware block supporting queue management (HQM) or equivalent interface improvements and pipelining of input stages as disclosed herein. The usage of HQM or equivalent interface improvements and pipelining can help to minimize chatter between virtual devices and processing cores due to the virtual device providing additional processing of packets before they are transferred to the processing cores of the CPU. Offloading workload to the GPU can make more computation resources available for other software functions on cores that may or may not be limited by computational resource availability.

FIG. 1 illustrates a schematic of an architecture 100 in accordance with some embodiments. As shown in FIG. 1, the architecture 100 can include a packet processing application 102, a software device driver 104, at least one processing core 106, a NIC 108, and an accelerator 110. In some embodiments, the accelerator is a GPU. However, embodiments are not limited thereto and the accelerator 110 can be implemented by using, for example, a field programmable gate array (FPGA).

During operation some data packet processing functions can be done by the GPU 110 as described later herein. Consequently, the at least one core 106 (e.g., at least a first core, and possibly a second core or more cores) of a CPU that runs packet processing applications can be freed from running these functions. As a result, the cores of the CPU can be utilized to process other data packets.

In a traditional computing device, the GPU is used for graphics processing and video stream transcoding. As disclosed herein, the GPU 110 can be repurposed to cooperate with the NIC 108 such that they appear as a single device (apparatus 200, FIG. 2) to software. In other words, software that utilizes the data packets processed by the apparatus 200 combination will in most embodiments be unaware that the data packets were not processed by the processing core 106. Consistent with embodiments disclosed herein, data packets can be transferred from the NIC 108 to the GPU 110 and back to the NIC 108 without entering the cores 106. In addition, the workload can be offloaded from partial cores as well. For example, some functions can be offloaded from a core 106 to move functions previously performed in software on the core 106 to a combined device, such as the apparatus 200 (FIG. 2).

Figure 2:
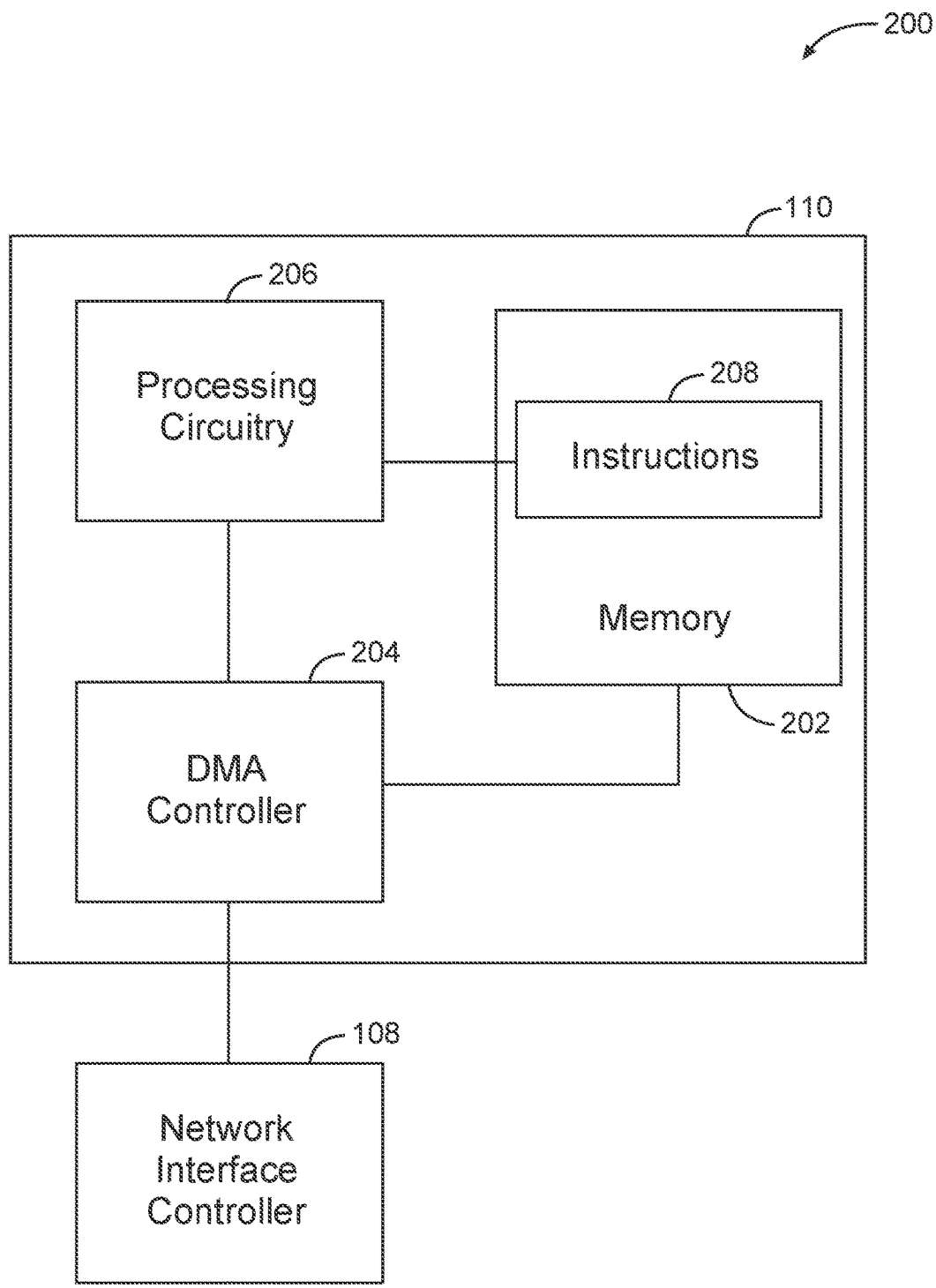
FIG. 2 illustrates a block diagram of an apparatus in accordance with some embodiments.

FIG. 2 illustrates an apparatus 200 in accordance with some embodiments. The apparatus 200 can include the NIC 108 to communicate with one or more hardware components. The apparatus 200 can further include an accelerator 110 (e.g., a GPU, FPGA, etc.). The apparatus 200 can also be referred to in some embodiments as a virtual NIC, as the apparatus 200 combines accelerator 110 and NIC 108 functions under a single software layer. The accelerator 110 can include memory 202 and a DMA controller 204 configured to receive data packets from the NIC 108 and to move the data packets to the memory 202. GPUs have their own on-board device memory, which can be as large as 6 GB or more. GPUs can access the device memory directly, so data can be copied via DMA over the PCIe bus. The PCIe bus is also used for CPU-GPU communication, such as launching GPU kernels and synchronizing states as the computation progresses.

The accelerator 110 can include processing circuitry 206 that generates processed data packets by implementing packet processing functions on the data packets received from the NIC 108. The processing circuitry 206 can also provide the processed data packets to at least one processing core 106 (FIG. 1) of a CPU. It will be understood that any or all of the functions and operations performed by processing circuitry 206 can be executed with hardware, software, firmware, or any combination thereof. In some embodiments, processing circuitry 206 can comprise one or more processing cores. The processing circuitry 206 can perform the various operations described herein with regard to the data packet processing pipeline (FIG. 3) by implementing instructions 208 (e.g., "software") stored within the memory 202. As such, the memory 202 can include machine-readable media.

Figure 3:
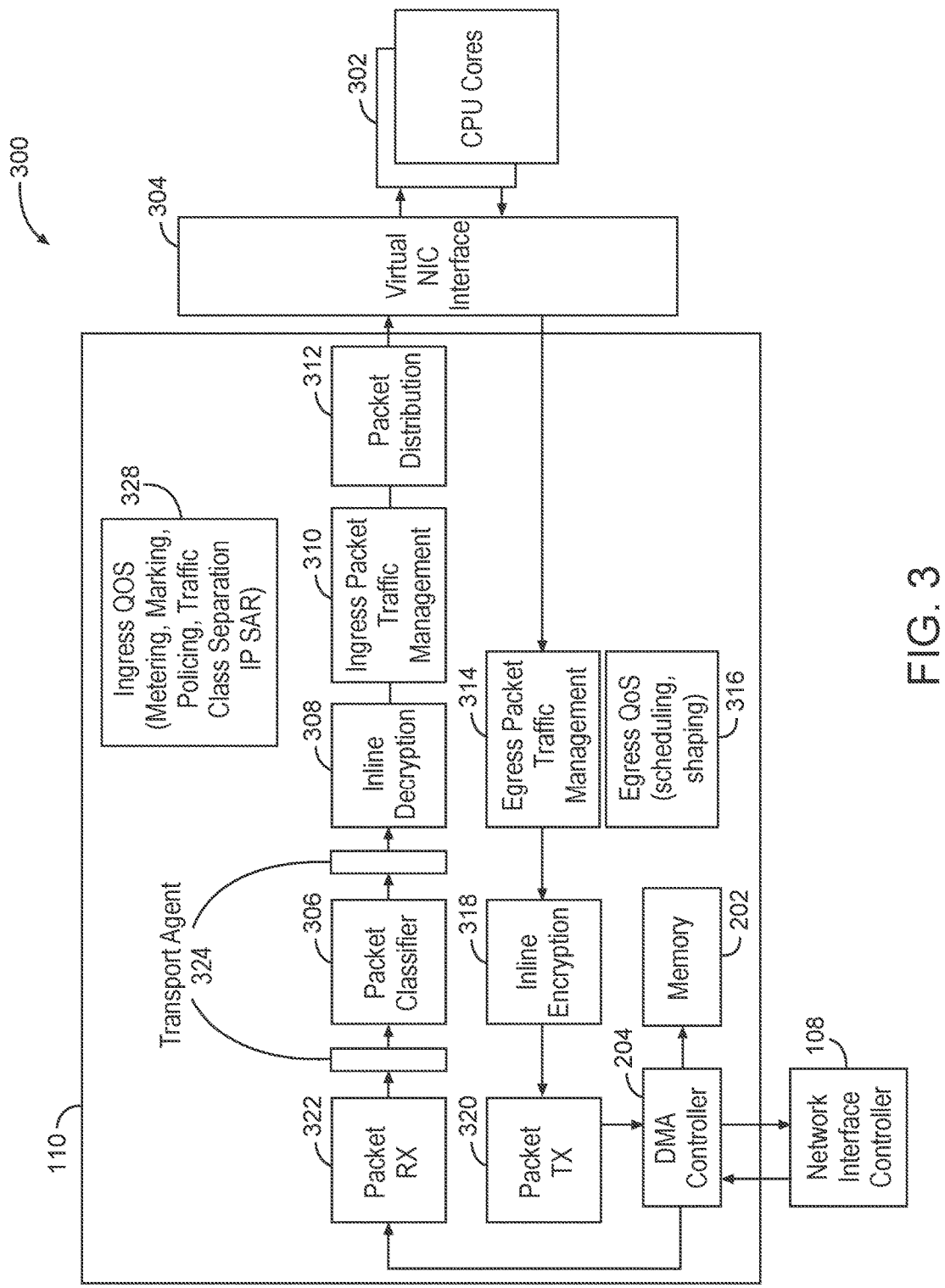
FIG. 3 illustrates an example data packet processing pipeline in accordance with some embodiments.

FIG. 3 illustrates an example data packet processing pipeline 300 in accordance with some embodiments. As shown in FIG. 3, a plurality of CPU cores 302 can run an application that can use a virtual NIC interface 304 to send and receive data packets using the apparatus 200.

The GPU 110 can include a variety of data packet processing, receiving, and transmitting functions. For example, the GPU 110 can include a data packet classifier 306 that can maintain a set of rules that classify which packet flow a packet belongs to based on the contents of the packet headers. Actions taken for each class (e.g., packet scheduling in an output queue, routing decisions, etc.) can further be performed in the GPU 110 or in other systems. The GPU 110 can include an inline decryption function 308. The GPU 110 can also include ingress packet traffic management 310 functions, which delays some or all datagrams to bring them into compliance with a desired traffic profile to enhance or guarantee performance, latency, and usable bandwidth for some kinds of packets. The GPU 110 can additionally include packet distribution functions 312 that can be used to process received data packets before sending the processed data packets to the plurality of CPU cores 302. The packet distribution functions 312 can also include another DMA controller (not shown in FIG. 3) interfacing to/from the virtual NIC interface 304 to assist with distribution of processed data packets to the plurality of CPU cores 302. In other embodiments, a mesh connection can be provided.

The GPU 110 can perform other functions 328 for ingress QoS, such as metering functions, marking functions, policing, traffic class separation, segmentation and reassembly (SAR).

The GPU 110 can also include egress packet traffic management 314, and egress QoS functions 316. Egress QoS functions can include scheduling and shaping. Scheduling functions can include first come first serve (FCFS), round robin, string priority, earliest deadline first schemes, and generalized processor sharing based on weight factors associated with packet flows. Shaping functions can decrease the burstiness of traffic by, for example, delaying the flow of packets designated as less important than those of prioritized traffic streams. The GPU 110 can include inline encryption 318 functionality for handling data packets received from the plurality of CPU cores 302. The GPU 110 can also include a packet transmitter 320, and a packet receiver 322. While some of the available interconnections and communication paths have been shown in FIG. 3, it will be appreciated that other functionalities can be provided and these functionalities can communicate in various ways that are not shown in FIG. 3 for clarity purposes only.

The GPU 110 can include a transport agent 324 to transport packets to and from the NIC 108 (or HFI), to hand over packets for other packet processing within the GPU, and to pass packets to and from the virtual NIC interface 304. In other words, the transport agent 324 can be considered an interworking function to track the state of packet processing and to handle NIC 108 interfaces. In some embodiments, the DMA controller 204 functions can be incorporated or viewed as a part of the transport agent 324 functions. The transport agent 324 can provide additional processing to packets by, for example, adding or stripping headers or addresses from data packets, among other operations, whether for providing the packets to the cores 302 or for receiving packets from the cores 302 for transmission to the network. For simplicity, the transport agent 324 has been shown in two locations in FIG. 3 although as described above the transport agent 324 can operate in various aspects of the pipeline 300. Functions of the transport agent 324 are also shown in FIGS. 4A and 4B.

In addition, the various functions and the sequence of the functions can be programmed and modified depending on application needs. For example, if certain data packets do not need to be encrypted or do not arrive encrypted, inline decryption function 308 and inline encryption 318 can be bypassed or otherwise omitted. In addition, the GPU 110 can interface with NIC 108 packet receiving and transmitting functions. Furthermore, an exception handling path can utilize CPU intervention with regard to NIC 108 operations.

Figure 4A:
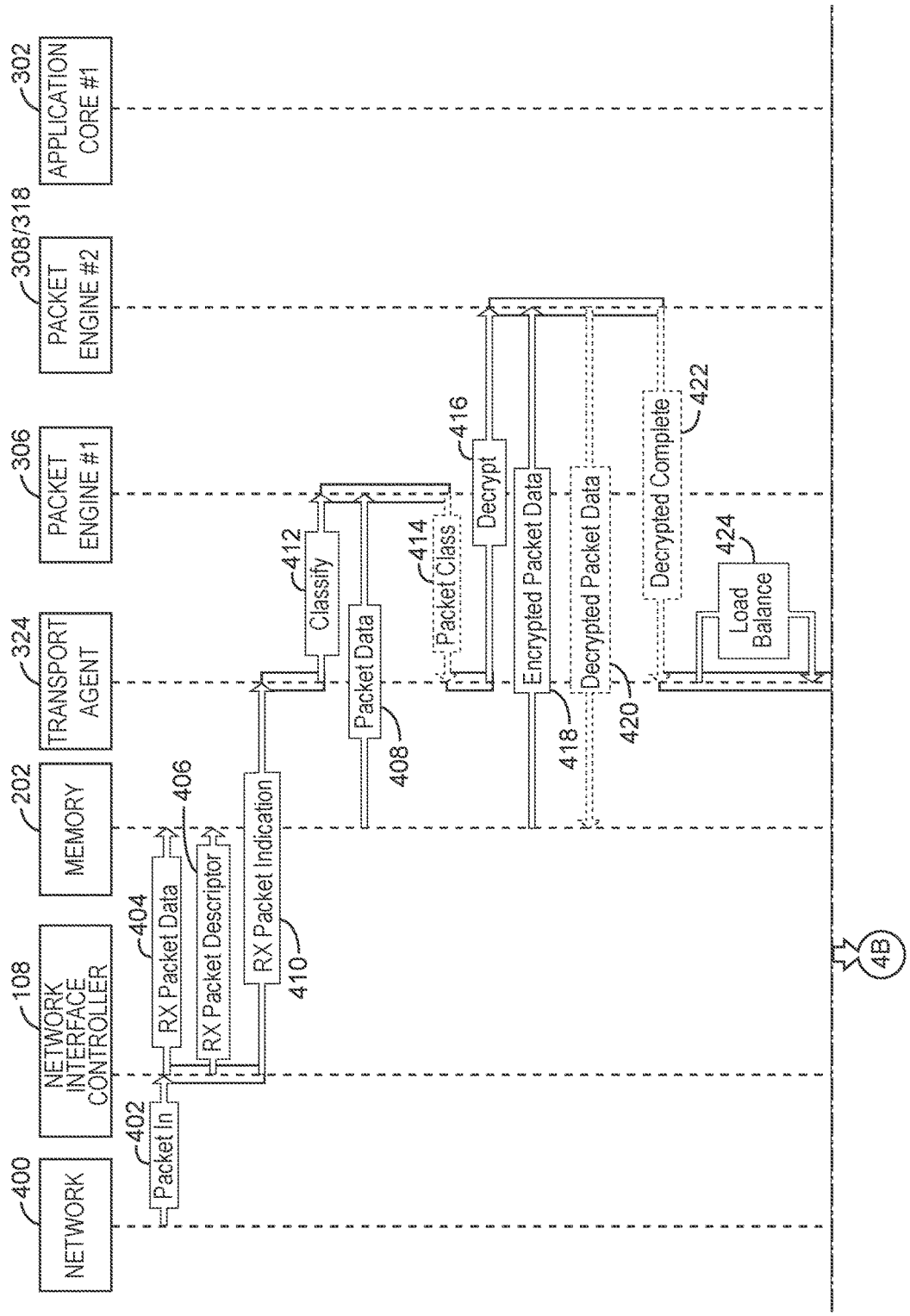
FIGS. 4A and 4B illustrates data packet ingress and egress paths in accordance with some embodiments.
Figure 4B:
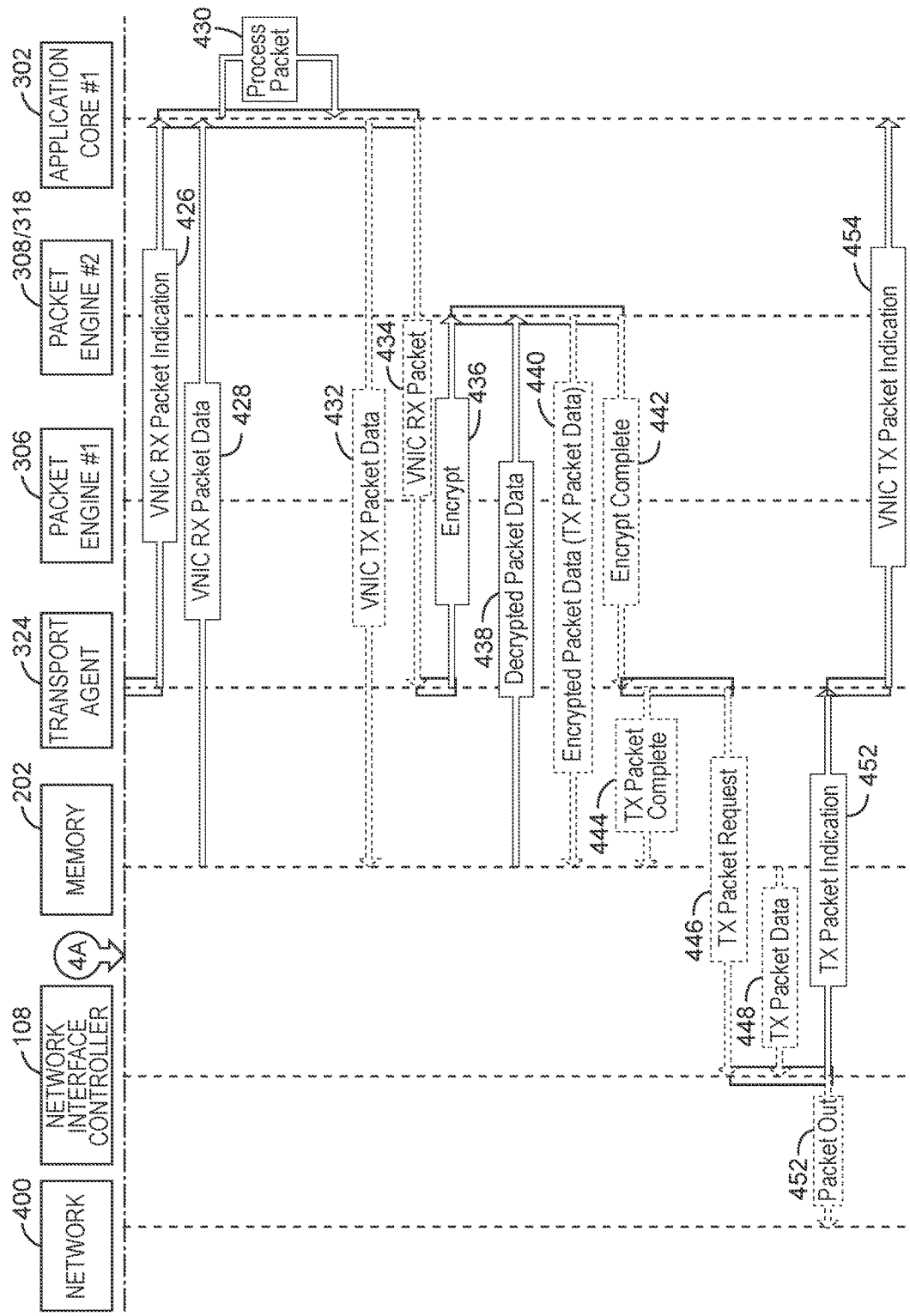

FIGS. 4A and 4B illustrate examples of data packet ingress and egress in accordance with some embodiments. In addition, FIGS. 4A and 4B illustrate examples of potential communications mechanisms between various stages defined via at least interrupts and user level interrupts. For example, as shown in FIGS. 4A and 4B, operations 410 and 452 (e.g., transmit (TX) and receive (RX) packet indications) can be implemented as interrupts, polling, or user level interrupt mechanisms. Similarly, operations 426 and 454 (e.g., virtual NIC TX and RX packet indications) can be implemented using interrupt, polling, user level interrupt, or callback mechanisms.

As an example, FIGS. 4A and 4B illustrate how a transport agent 324 can interface with memory 202 and the various functional blocks shown in FIG. 3. The packet engines can implement various stages of packet processing functions. In operation 402, a data packet can arrive from a network 400 at NIC 108. In operation 404, the NIC can provide the data packet to memory 202 (or to a DMA controller 204, which can move the data packet to memory 202 as described earlier herein). In operation 406, the NIC 108 can provide a data packet descriptor to the memory 202. The memory 202 can then provide the data packet to data packet classifier 306 in operation 408. Additionally or alternatively, the NIC 108 can generate an interrupt (or use any other mechanism such as polling, or user-level interrupt mechanisms) in operation 410 to signal to the transport agent 324 that a data packet has been received, and the transport agent 324 can provide the data packet in operation 412 to the data packet classifier 306. In operation 414, the data packet classifier 306 can provide the classified packet to the transport agent 324, which can in turn add classification headers or other information to the classified packet based on the information provided by the data packet classifier.

In operation 416, the transport agent 324 can provide the classified packet (e.g., the packet generated at operation 414) to the inline decryption function 308. Alternatively, in operation 418, the memory 202 can provide an encrypted data packet to the inline decryption function 308. In operation 420, the inline decryption function 308 provides the decrypted packet to the memory 202. Additionally or alternately, in operation 422, the inline decryption function 308 provides the decrypted data packet to the transport agent 324.

In operation 424, the transport agent 324 performs load balancing to determine which core/s 302 should receive packets. The transport agent 324 can split packets (on a per-packet basis, a per-flow basis or other basis) among multiple paths (e.g., to different cores) to achieve load balancing. The transport agent 324 can use algorithms such as round-robin scheduling or schemes based on detection of utilization levels for various core/s 302 to perform load balancing.

In operation 426, the transport agent 324 uses interrupts, polling, user level interrupts or a callback mechanism over the virtual NIC interface 304 to provide the processed data packet to a core 302. Alternatively, memory 202 can provide the packet data to the virtual NIC interface 304.

In operation 430, the CPU core 302 can perform any packet processing, such as by providing data packets to applications running on the core 302. In some embodiments, the CPU core 302 can perform transmissions of data packets. Accordingly, the core 302 can indicate the availability of data packets for transmission in operation 432 through mechanisms that can include interrupts, polling, user-level interrupts, callbacks, etc. In some embodiments, in operation 434, the core 302 can provide the data packets to the transport agent 324 and the transport agent 324 can provide the data packet to an inline encryption 318 engine for encryption in operation 436. In other embodiments, in operation 432, decrypted packets can be provided to the memory 202 and the memory 202 can provide the decrypted packet for encryption in operation 438. In operation 442, encrypted data packets are provided to the transport agent 324. In operation 444, the transport agent 324 can indicate that the packets are ready for transmission, to the memory 202 and in operation 446, the transport agent 324 can request that the NIC 108 transmit the corresponding data packet. In operations 450, 452, and 454, the NIC 108 can transmit the packet to the network 400 and provide confirmation to the transport agent 324, which in turn provides confirmation to the core 302.

The various transmission pathways shown in FIGS. 4A and 4B can be altered depending on the application. For example, as indicated above, certain data packets may not need to be encrypted and thus, the transmission pathway for those data packets can omit a pathway that would route them to encryption circuitry. In addition, after processing by the application cores 302, the data packets may need to be encrypted before transmission to the network 400. Thus, the transmission pathway can be altered to include a pathway that would route the data packets to encryption circuitry. Stated another way, the transmission pathways can be static or dynamic depending on the application.

EXAMPLE METHODS

Figure 5:
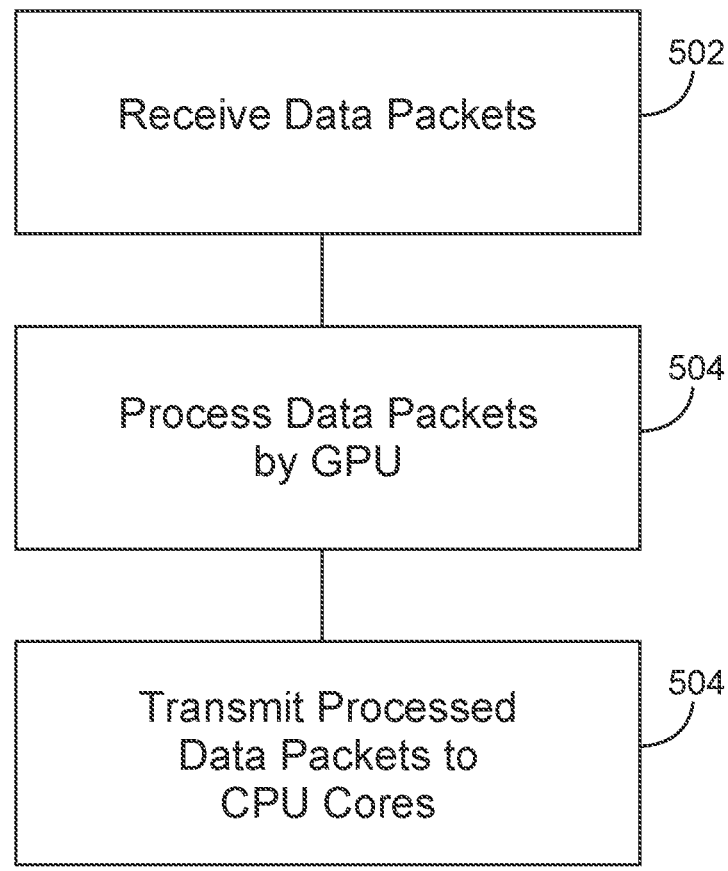
FIG. 5 illustrates an example method in accordance with some embodiments.

Various methods can be implemented in accordance with various embodiments to perform functions of usage models described above, as well as other usage models. FIG. 5 is a flow diagram of an example method 500 in accordance with some embodiments. An apparatus 200, as described here or elements thereof (e.g., GPU 110, NIC 108, etc.), can perform operations of the example method 500. Accordingly, the example method 500 will be described with reference to components of FIGS. 1-4. For example, processing circuitry 206 can perform one or more operations of example method 500.

The example method 500 begins with operation 502 with the processing circuitry 206 receiving data packets. As described herein the data packets can be received from the NIC 108.

The example method 500 continues with operation 504 with processing circuitry 206 processes the data packets. For example, the processing circuitry 206 can perform any of the functions in the data packet processing pipeline shown in FIG. 3. Consistent with embodiments disclosed herein, the data packets are processed such that the software operating on the CPU cores 302 are not aware that the data packets have been processed by the GPU 110 beforehand. In other words, the CPU cores 302 see the NIC 108 and GPU 110 as a single integrated device (e.g., the apparatus 200 (FIG. 2)) instead of two separate components.

The example method 500 continues with operation 506 with processing circuitry 206 transmitting the processed data packets to the CPU cores 302. Once the GPU 110 has processed the data packets, the processed data packets can then be sent to the CPU cores 302 for use by various applications.

The example method 500 of receiving, processing and transmitting data can also be carried out in reverse. For example, the GPU 110 can receive data packets from the CPU cores 302, process the data packets, and transmit the processed data packets to the NIC 108 for transmission to the network 400.

In embodiments, the example method 500 can include additional operations such as, for example, detecting traffic load characteristics corresponding to the plurality of packet streams and directing one or more packet streams to the one or more of the CPU cores 302 based on traffic load characteristics and load balancing performed by the GPU 110.

Examples, as described herein, may include, or may operate on, logic or a number of circuits, components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more processors of the GPU 110 may be configured by firmware or software (e.g., instructions 208 (FIG. 2), an application portion, or an application) as a module that operates to perform specified operations. In an example, the software may reside on at least one machine-readable medium. In an example, the software, when executed by the underlying hardware of the module (e.g., the GPU 110), can include instructions 208 (FIG. 1) to cause the hardware to perform the specified operations.

For example, instructions 208 can cause GPU 110 to detect characteristics of a plurality of packet streams received at a NIC 108. In various embodiments, the instructions 208 can optionally cause the hardware to detect traffic load characteristics corresponding to the plurality of packet streams and to direct one or more packet streams to the one or more CPU cores 302 based on traffic load characteristics.

While a machine-readable medium may include a single medium, the term "machine-readable medium" may include a single medium or multiple media (e.g., a centralized or distributed database, and/or associated caches and servers).

The term "machine-readable medium" may include any medium that is capable of storing, encoding, or carrying instructions 208 for execution by a machine (e.g., the apparatus 200, GPU 110, or any other processor or circuitry) and that cause the machine to perform any one or more of the techniques of the present disclosure, or that is capable of storing, encoding or carrying data structures used by or associated with such instructions. In other words, the processing circuitry 206 (FIG. 2) can include instructions and can therefore be termed a machine-readable medium in the context of various embodiments. Other non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 208 may further be transmitted or received over a communications network using a transmission medium utilizing any one of a number of transfer protocols (e.g., frame relay, internet protocol (IP), TCP, user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi), IEEE 802.16 standards (WiMax®) and others), peer-to-peer (P2P) networks, or other protocols now known or later developed.

The term "transmission medium" shall be taken to include any intangible medium that is capable of storing, encoding or carrying instructions for execution by hardware processing circuitry, and includes digital or analog communications signals or other intangible medium to facilitate communication of such software.

Additional Notes & Examples

Example 1 includes subject matter (such as a device, processor, computer device, electrical apparatus, etc.) including a network interface controller (NIC); memory; and an accelerator comprising: a direct memory access (DMA) controller configured to receive data packets from the NIC and to move the data packets to the memory; and processing circuitry configured to generate processed data packets by implementing packet processing functions on the data packets received from the NIC, and provide the processed data packets to at least one processing core of a central processing unit (CPU).

In Example 2, the subject matter of Example 1 can optionally include wherein the accelerator comprises a graphics processing unit (GPU).

In Example 3, the subject matter of Example 2 can optionally include a transport agent to transport packets between the NIC and the accelerator.

In Example 4, the subject matter of Example 3 can optionally include wherein the packet processing functions include packet classifier functions.

In Example 5, the subject matter of Example 4 can optionally include wherein the transport agent is further configured to provide packets to the packet classifier functions.

In Example 6, the subject matter of Example 4 can optionally include wherein the transport agent is further configured to track a state of packet processing.

In Example 7, the subject matter of Example 2 can optionally include wherein the accelerator comprises packet transmit and packet transmit functions.

In Example 8, the subject matter of any one of Examples 1-7 can optionally include wherein the NIC and the accelerator comprise a software layer that forms a virtual NIC interface to provide the processed data packets to the at least one processing core.

In Example 9, the subject matter of Example 8 can optionally include wherein the virtual NIC presents offload capability information for the accelerator and the NIC to the at least one processing core.

In Example 10, the subject matter of Example 9 can optionally include a second DMA controller for providing the processed data packets to the virtual NIC interface.

In Example 11, the subject matter of any of Examples 1-10 can optionally include wherein the accelerator comprises a field programmable array (FPGA).

In Example 12, the subject matter of any of Examples 1-11 can optionally include wherein the processed data packets are provided to the at least one processing core using a mesh connection.

In Example 13, the subject matter of any of Examples 1-12 can optionally include wherein the processing circuitry is configured to perform load balancing operations.

In Example 14, the subject matter of any of Examples 1-13 can optionally include circuitry for receiving data packets from the at least one processing core for transmission using the NIC.

In Example 15, the subject matter of any of Examples 1-14 can optionally include wherein the packet processing functions include decryption functions for data packets provided to the at least one processing core, and encryption functions for data packets received from the at least one processing core.

In Example 16, the subject matter of Example 15 can optionally include wherein the packet processing functions includes scheduling functions for scheduling transmission of data packets received from the at least one processing core.

Example 17 includes subject matter (such as a data center system, networking system, or other system) including a network interface controller (NIC) configured to transmit and receive data from a network; a central processing unit (CPU) including a first core and a second core; an accelerator in electrical communication with the CPU and the NIC, the accelerator including a direct memory access (DMA) controller, processing circuitry and a memory storing instructions that, when executed by the accelerator, cause the accelerator to perform operations comprising: generating processed data packets by implementing packet processing functions on the data packets received from the NIC, and providing the processed data packets to at least one of the first core or the second core.

In Example 18, the subject matter of Example 17 can optionally include wherein the packet processing functions include at least one of packet encryption, packet decryption, and packet classification.

In Example 19, the subject matter of any of Examples 17-18 can optionally include wherein the accelerator is further configured to perform load balancing operations to balance processing loads between at least the first core and the second core.

Example 20 includes subject matter such as a machine-readable medium including instructions that, when executed on a machine (such as a control device, electrical apparatus, graphics processing unit (GPU), processor, NIC card, or other Ethernet device, etc.) cause the machine to perform operations comprising: providing data packets from a network interface controller (NIC) at a direct memory access (DMA) controller of the GPU; processing the data packets using packet processing functions, the packet processing functions including at least one of a decryption function and a packet classification function, to generate processed data packets; and providing the processed data packets to at least one processing core of a central processing unit (CPU).

In Example 21, the subject matter of Example 20 can optionally include wherein the instructions further include providing the processed data packets to two or more processing cores of the CPU according to a load balancing operation.

In Example 22, the subject matter of any of Examples 20-21 can optionally include receiving data packets from the at least one processing core; and providing the data packets to the NIC according to a scheduling function.

Example 23 includes a graphics processing unit (GPU) having means for transmitting and receiving data packets to and from a network; means for transmitting processed data packets to a plurality of cores of a central processing unit (CPU); and means for generating the processed data packets for transmission to the plurality of cores.

In Example 24, the subject matter of Example 23 can optionally include wherein the means for transmitting the processed data packets to the plurality of cores includes a mesh connection.

In Example 21, the subject matter of Example 19 can optionally include means for performing load balancing between the plurality of cores.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An apparatus comprising:
a network interface controller (NIC);
memory; and
an accelerator comprising:
a direct memory access (DMA) controller configured to receive data packets from the NIC and to move the data packets to the memory; and
processing circuitry configured to
generate processed data packets by implementing packet processing functions on the data packets received from the NIC, and
provide the processed data packets to at least one processing core of a central processing unit (CPU) external to the apparatus, wherein the NIC and the accelerator include a software layer that forms a virtual NIC interface to provide the processed data packets between the accelerator and the at least one processing core.

2. The apparatus of claim 1, wherein the accelerator comprises a graphics processing unit (GPU).

3. The apparatus of claim 2, further comprising a transport agent to transport packets between the NIC and the accelerator.

4. The apparatus of claim 3, wherein the packet processing functions include packet classifier functions.

5. The apparatus of claim 4, wherein the transport agent is further configured to provide packets to the packet classifier functions.

6. The apparatus of claim 4, wherein the transport agent is further configured to track a state of packet processing.

7. The apparatus of claim 2, wherein the accelerator comprises packet transmit and packet transmit functions.

8. The apparatus of claim 1, wherein the virtual NIC interface is to provide the processed data packets to the at least one processing core.

9. The apparatus of claim 8, wherein the virtual NIC presents offload capability information for the accelerator and the NIC to the at least one processing core.

10. The apparatus of claim 9, further comprising:
a second DMA controller for providing the processed data packets to the virtual NIC interface.

11. The apparatus of claim 1, wherein the accelerator comprises a field programmable array (FPGA).

12. The apparatus of claim 1, wherein the processed data packets are provided to the at least one processing core using a mesh connection.

13. The apparatus of claim 1, wherein the processing circuitry is configured to perform load balancing operations.

14. The apparatus of claim 1, further comprising:
circuitry for receiving data packets from the at least one processing core for transmission using the NIC.

15. The apparatus of claim 1, wherein the packet processing functions include decryption functions for data packets provided to the at least one processing core, and encryption functions for data packets received from the at least one processing core.

16. The apparatus of claim 15, wherein the packet processing functions includes scheduling functions for scheduling transmission of data packets received from the at least one processing core.

17. A system comprising:
a central processing unit (CPU) including a first core and a second core;
an accelerator in electrical communication with the CPU, the accelerator including a direct memory access (DMA) controller, processing circuitry and a memory, the accelerator to perform operations comprising:
generating processed data packets by implementing packet processing functions on the data packets received from the NIC, and
providing the processed data packets to at least one of the first core or the second core; and a network interface controller (NIC) configured to transmit and receive data from a network, wherein the NIC and the accelerator include a software layer that forms a virtual NIC interface to provide the processed data packets between the accelerator and the CPU.

18. The system of claim 17, wherein the packet processing functions include at least one of packet encryption, packet decryption, and packet classification.

19. The system of claim 17, wherein the accelerator is further configured to perform load balancing operations to balance processing loads between at least the first core and the second core.

20. A non-transitory machine-readable medium storing instruction that, when executed by a graphics processing unit (GPU), cause the GPU to perform operations comprising:
providing data packets from a network interface controller (NIC) at a direct memory access (DMA) controller of the GPU;
processing the data packets using packet processing functions, the packet processing functions including at least one of a decryption function and a packet classifier function, to generate processed data packets; and
providing the processed data packets to at least one processing core of a central processing unit (CPU) external to the GPU and NIC, wherein the NIC and the GPU include a software layer that forms a virtual NIC interface to provide the processed data packets between the GPU and the at least one processing core.

21. The non-transitory machine-readable medium of claim 20, wherein the instructions further include providing the processed data packets to two or more processing cores of the CPU according to a load balancing operation.

22. The non-transitory machine-readable medium of claim 20, wherein the operations further include:
receiving data packets from the at least one processing core; and
providing the data packets to the NIC according to a scheduling function.

23. A graphics processing unit (GPU) comprising:
means for transmitting and receiving data packets to and from a network;

means for transmitting processed data packets to a plurality of cores, external to the GPU, of a central processing unit (CPU); and means for generating the processed data packets for transmission to the plurality of cores.

24. The GPU of claim 23, wherein the means for transmitting the processed data packets to the plurality of cores includes a mesh connection.

* * * * *

UNITED STATES PATENT AND TRADEMARK OFFICE
CERTIFICATE OF CORRECTION

PATENT NO. : 10,331,590 B2  
APPLICATION NO. : 15/198714  
DATED : June 25, 2019  
INVENTOR(S) : MacNamara et al.

Page 1 of 1

It is certified that error appears in the above-identified patent and that said Letters Patent is hereby corrected as shown below:

In the Claims

Column 11, Line 28, Claim 1, after "to", insert --:--

Column 11, Line 62, Claim 11, before "array", insert --gate--

Column 12, Line 25, Claim 17, after "and", insert --¶--

Signed and Sealed this  
Fourteenth Day of April, 2020

Andrei Iancu  
*Director of the United States Patent and Trademark Office*